Feb. 25, 1969  J. J. BUCKLEY ET AL  3,429,188

ANGULAR VELOCITY MEASURING DEVICE

Filed Aug. 26, 1965

WITNESSES
Edwin E. Bussler
James F. Young

INVENTORS
John J. Buckley &
Joseph W. Shearer, Jr.
BY
W. F. Stratiff

United States Patent Office 3,429,188
Patented Feb. 25, 1969

3,429,188
ANGULAR VELOCITY MEASURING DEVICE
John J. Buckley, Baltimore, and Joseph W. Shearer, Jr., Glen Burnie, Md., assignors to Westinghouse Electric Corporation, Pittsburgh, Pa., a corporation of Pennsylvania
Filed Aug. 26, 1965, Ser. No. 482,811
U.S. Cl. 73—505     5 Claims
Int. Cl. G01p 15/10, 15/14

ABSTRACT OF THE DISCLOSURE

A vibratory gyro device having a hollow cylindrical vibratory element suported about its circumference in a nodal plane equidistant its opposite ends, includes a reed-like flexure spring pivotally mounted at its midlength in coincidence with such nodal plane and extending at its opposite sides therefrom into vibratory coupling with the outer surface of the cylindrical vibratory element to act as a nulling means for unwanted cross-coupling vibrations which otherwise appear in the output of such vibratory element. By changing the angular attitude of the flexure spring, its effectiveness can be adjusted to suit requirements.

---

The present invention further relates to what is considered to be an improvement in vibratory gyro devices of the type set forth in U.S. Patent No. 3,182,512, issued May 11, 1965, which employs a self-driven vibratory element or unitized assemblage of electrostrictive material and/or magnetostrictive material so constructed and arranged as to vibrate in a driven rectilinear or radial mode relative to an input axis and 180° out-of-phase at opposite sides of a nodal plane, so that during each cycle of vibration one end is contracting while the other end is expanding, and wherein the output mode of vibration responsive to turning of the element about such input axis is torsional and 180° out-of-phase at opposite sides of such nodal plane. The vibratory element or elemental assemblage is mounted along the nodal plane to receive input turning effort with minimal restraint to vibration of such element. A preferential configuraiton for the vibratory element is in the form of a hollow cylinder to facilitate fabrication of such element with a relatively high degree of symmetry of shape and accuracy in size.

Under ideal conditions, the vibratory driving forces created in the vibratory element for the driven mode do not couple into the output torsional sensing mode in absence of input turning motion applied to the element. As a practical matter, however, small asymmetries in the shape and/or mass distribution fo the vibratory element are difficult to remove and can cause cross coupling between the driven and output modes of vibration of the element. This produces a zero rate signal that tends to overshadow the output signal responsive to rate or turning of the element about its input axis. It therefore becomes a primary object of the present invention to provide such a vibratory gyro device with means for nulling of the cross coupling signal.

It is another object of the present invention to provide a vibratory gyro device for the aforementioned type with a cross-coupling-nulling means which is relatively simple in principle, mechanization, and use.

It is still another object of the present invention to provide a vibratory gyro device of the aforedescribed type with cross-coupling-nulling means which places no special requirements on associated electronic circuitry affiliated with such device.

In general, the foregoing objects are obtained by the provision of a nulling spring means exemplified in the form of a simple flexure spring which is constructed and arranged to engage the vibratory element at opposite sides of the nodal plane to oppose any torsional vibration which may be imparted to the element by cross coupling from its driven mode of vibration. In the illustrative embodiment set forth herein, the effectiveness of such nulling spring means is obtained simply by varying its angular position relative to a pivot point located along the nodal plane of the vibratory element to thereby obtain a selectable variation in the effectiveness of such nulling spring according to need.

Other objects, features, and advantages of the invention will become obvious from the following detailed description of such invention when taken in connection with the accompanying drawings in which.

Figure 1:
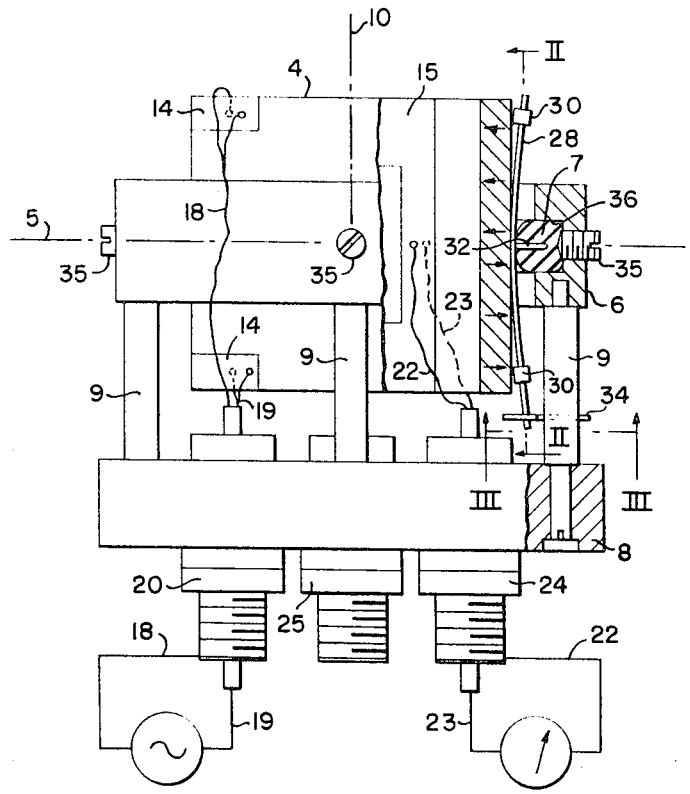
FIGURE 1 is an elevational view, partly in outline and partly in section, of a vibratory gyro device embodying the invention.

Referring to FIG. 1 in the drawings, the vibratory gyro device with which the invention is affiliated, for illustrative purposes, comprises a vibratory element 4 in the form of a hollow cylinder of electrostrictive material, such as barium titanate, which is supported around its outer periphery at a nodel plane 5 equidistant its opposite ends by an annular coaxial support ring member 6 through the medium of an O-ring 7 of resiliant material, such as neoprene rubber. The support ring member 6 in turn is carried by a base member 8 through the medium of a plurality of circumferentially-spaced-apart pedestals 9 via which the vibratory element may be turned about its axis to constitute the input turning axis 10 about which rate of turning information is desired. The vibratory element 4 is suitably polarized, for example as the FIGURE 9 shown in Patent 3,182,512; the driven mode being poled radially inward at one end and radially outward at the other end as indicated by the arrows. The output mode is poled circumferentially. Only the active parts of the element are poled. The functions of the input and output modes can be interchanged. Suitable input and output electrodes 14 and 15 are provided on its inner and outer surfaces which are so arranged with respect to the polarization of the element as to obtain a driven mode of vibration of the element in a radial direction 180° out-of-phase at opposite sides of the neutral or nodal plane 5 by a suitable energization of the input electrodes 14, and to obtain an oscillatory output signal from the output electrodes 15 in response to 180° out-of-phase torsional vibration at opposite sides of the neutral plane 5 as a precessional reaction to turning effort imparted to the vibratory element 4 about the input axis 10 during such push-pull radial driven mode of vibration, such as described in some detail in the aforementioned U.S. Patent 3,182,512. Connection of the input electrodes 14 to a high frequency energization source may be obtained by way of flexible leads 18 and 19 bonded at one end to such electrodes, and an ultraminiature coaxial connector 20 mounted on the base member 8. Similarly the output electrodes 15, only one of which is shown in the drawings may be connected electrically to turn rate indicator means (not shown) through the medium of flexible leads 22 and 23 bonded at one end to such output electrodes and a similar connector 24 affiliated with the base member. A third connector 25 affiliated with the base member may accommodate output leads, not shown, for connection to feedback electrodes, not shown, for inclusion in a frequency-stabilization circuit arrangement, not shown, which per se, forms no part of the present invention. The dimensions of the vibratory elements preferably are chosen such that the radial driven mode of vibration and the torsional output mode of vibration have the same resonat frequency to produce the highest gain possible by such vibratory element. Heretofore, such frequency has been in the neighborhood of 100,000 c.p.s. in at least one experimental device.

While the vibratory element 4 is being driven in its radial mode in push-pull at opposite sides of the midplane 5 of such element, in absence of any turning movement imparted to such element about the input axis 10 no significant amount of vibration in the torsional or output mode should be experienced by such vibratory element. However, in the presence of asymmetries in the size and shape of such element, a cross coupling may exist between the two vibratory modes so that accordingly a torsional, or output mode, vibration may occur even in the absence of input motion about the input axis, which results in an undesired output signal from such element. Such undesired output signal at zero turn rate input tends to lessen the sensitivity of the device. In accordance with the prime novel feature of the present invention, a nulling spring means 28 is provided in the form of a stiff rod-shaped element which extends generally parallel to axis 10 along an exterior surface of the vibratory element 4 and engages the outer surface of such element at points spaced apart from the neutral plane 5 and substantially equal distances through the medium of a pair of coupling elements 30 which can take the form of short lengths of resilient tubing bonded to such spring 28 at the desired locations. The nulling spring 28 is held in place through the medium of a mounting pin 32 which is secured thereto equidistant its opposite ends and which projects into a suitable opening in the O-ring 7 which is disposed in an annular groove 36 formed in the support ring member 6.

Figure 2:
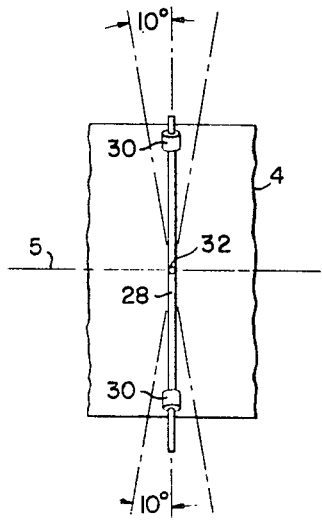
FIG. 2 is a view taken along the line II—II in FIG. 1 showing another view of the nulling spring means embodied in the device of FIG. 1.
Figure 3:
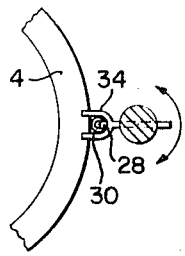
FIG. 3 is a bottom view of a nulling-spring-adjusting means embodied in the device shown in FIG. 1, as observed along the line III—III therein.

During torsional vibration of the vibratory element 4 in 180° out-of-phase relationship with respect to action at opposite sides of the neutral plane 5, the nulling spring 28 will flex in opposite directions about the mounting pin 32 to impose a constraint on the vibratory element 4 in opposition to its cross-coupled torsional vibration and thereby effect a cancellation thereof and thus enable nulling of the cross coupling signal at the zero turn rate input to the device. By turning the nulling spring 28 to different angular positions with respect to the mounting pin, the nature of the action of the spring is not altered but the effective length of such spring with respect to its reaction with the vibratory element is altered by the bringing of the spring coupling elements 30 closer or further away from the neutral plane 5, as may be appreciated from the showing in FIG. 2. To facilitate such adjustment, one of the pedestal elements 9 is constructed and arranged for rotary movement about its own axis and is provided with a spring adjustment member in the form of a fork which engages the lowermost end of the nulling spring to effect such adjustment in angular position thereof.

As a vernier type adjustment, the illustrative embodiment of the invention also includes a provision for the adjustment in the degree of compression of the O-ring against the outer periphery of the vibratory element 4 at several of the circumferentially-spaced-apart location therearound by the provision of an adjusting screw member 35 at each of such locations which is mounted in the support ring member 6 and provided with screwdriver slots whereby such adjustment may be made. At such locations in the vicinity of the adjusting screw members 35, the engagement of the O-ring 7 against the outer periphery of the vibratory element also acts as small short-length flexure springs which oppose torsional vibration of the vibratory element in push-pull at opposite sides of the neutral plane 5 inasmuch as the midplane of the O-ring coincides with that of such neutral plane.

Laboratory results have been obtained wherein by adjusting a nulling spring fabricated from a section of sewing needle of stiff hardened steel, zero rate cross-feed signals have been reduced from tenths of volts to zero volts D.C. The adjustment of the primary nulling spring 28 was quite sensitive when the electrical signal was reduced below 100 millivolts D.C. The gyro output signal calibrations during such evaluation was approximately one millivolt D.C. per degree per second. The vernier nulling adjusting screws had a limited operational range of about ±100 millivolts D.C., and were well suited to make the final precise nulling adjustment. The nulling adjustments were found to have a negligible effect on the resonant frequency of a vibratory element 4 of the type illustrated in FIG. 1 so long as the forces applied by virtue of adjustment of the screw members 35 did not affect the maximum resonant mode of operation of the vibratory element. The maximum observed frequency change was approximately 100 cycles per second out of 100,000 cycles per second. There was no indication that the rate sensitivity of the gyroscope is affected by the nulling technique set forth herein.

While the invention has been shown and described with a degree of particularity relative to an illustrative embodiment thereof, it is intended that the appended claims define the true spirit and scope of the invention such as to embrace modifications which may readily occur to those versed in the art.

We claim as our invention:

1. A vibratory gyro device having an input axis for response to rate of turning thereabout, a self-driven vibratory element constructed and arranged to have a certain driven mode of vibration and to be responsive to turning movement about said input axis to vibrate also in an output mode for producing an output signal indicative of the rate of such turning movement, nulling spring means engaging said vibratory element to oppose any output mode vibration which may tend to exist while said element is not being turned about said axis, and means for adjusting the effectiveness of said nulling spring means.

2. A vibratory gyro device having an input axis for response to rate of turning thereabout, a self-driven vibratory element constructed and arranged to vibrate in a certain driven mode and to vibrate also in a signal-producing output mode in 180° out-of-phase relationship at opposite sides of a nodal region of such element during turning thereof about said input axis, and a flexible reed-like nulling spring having a support intermediate its ends in coincidence with said nodal region and being in vibration-coupling contact with said vibratory element at opposite sides of said nodal region to oppose any output mode vibration which may tend to exist in absence of any turning motion of said element about said axis.

3. A vibratory gyro device having an input axis for response to rate of turning thereabout, a self-driven hollow cylindrical vibratory element constructed and arranged for vibration in a radial, driven mode 180° out-of-phase at opposite sides of a nodal plane equidistant its opposite ends and to vibrate also in a torsional, output, signal-producing mode 180° out-of-phase at opposite sides of said nodal plane responsively to be turned about its axis, means for supporting and transmitting input turning movement to said vibratory element in the vicinity of said nodal plane, and flexural nulling spring means supported in the vicinity of said nodal plane and coupled to said vibratory element at opposite sides of said plane to cancel out any torsional, output, signal-producing mode vibration which may tend to exist in absence of any turning of said vibratory element about its axis.

4. A vibratory gyro device as set forth in claim 3, wherein said nulling spring means includes a reed-like flexural spring member having a pivot support intermediate its ends at the nodal plane of the vibratory element with means affixed thereto for vibration transmitting coupling with said vibratory element selected distances at opposite sides of the nodal plane according to angular position of said reed-like flexural spring member about its pivot support.

5. A vibratory gyro device as set forth in claim 4 wherein said nulling spring means also includes vernier-type adjustable nulling means which imposes torsional vibration constraint to the vibratory element in the immediate vicinity of its nodal plane at a plurality of circumferentially-spaced apart locations therearound by resilient-material-means adjustably forced against said vibratory element at such locations.

References Cited

UNITED STATES PATENTS

| | | | |
|---|---|---|---|
| 2,455,939 | 12/1948 | Meredith | 73—505 |
| 2,616,681 | 11/1952 | Morrow | 73—505 |
| 3,182,512 | 5/1965 | Jones et al. | 73—505 |

JAMES J. GILL, Primary Examiner.